Jan. 30, 1968   P. E. GREINER   3,365,818
MECHANICAL ARTIFICIAL FISHING LURE GUIDE
Filed Jan. 20, 1966   2 Sheets-Sheet 1

INVENTOR
Paul E. Greiner
BY *Clive H. Bramson*
ATTORNEY

Jan. 30, 1968 P. E. GREINER 3,365,818
MECHANICAL ARTIFICIAL FISHING LURE GUIDE
Filed Jan. 20, 1966 2 Sheets-Sheet 2

INVENTOR
Paul E. Greiner

BY Olive H. Bramson

ATTORNEY

United States Patent Office 3,365,818
Patented Jan. 30, 1968

3,365,818
MECHANICAL ARTIFICIAL FISHING
LURE GUIDE
Paul E. Greiner, Mobile, Ala.
(Box 1693, Brookley A.F.B., Ala. 36615)
Filed Jan. 20, 1966, Ser. No. 521,942
7 Claims. (Cl. 35—74)

This invention relates to new and useful improvements in fishing lure guides and more particularly to a mechanical fishing lure guide which is circular of configuration and which will provide the user with a color reference guide to numerous salt and fresh water artificial fishing lures.

Accordingly, and consonant with the foregoing, the instant invention has for an object the provision of a circular device capable of portraying the indentity of the lure by the predominant color of the principal item in the composition of the lure rather than by its commercial popular name.

Another object of the present invention is to provide a device of the foregoing character having a separate and individual guide for each group or type of lure, i.e., fly lures (wet and dry), spinning lures, plugs, streamers, spinners and spoons (fresh and salt water).

A further object of this invention resides in the provision of an artificial fishing lure guide which may be readily attached to or carried in the clothing of the user or his equipment and which may be expediently operated by one hand.

Another general object of the present invention is to provide a device of the described character which will be simple in structure, economical of manufacture and highly effective in use.

Other objects and advantages of the instant fishing lure guide will be set forth in part hereinafter and in part will be obvious herefrom, or may be learned by practice of the invention, the same being realized and attained by means of the structure defined and pointed out in the appended claims.

The accompanying drawings referred to herein and constituting a part hereof, illustrate one embodiment of the invention, and together with the description, serve to explain the principles of the invention.

Figure 1:
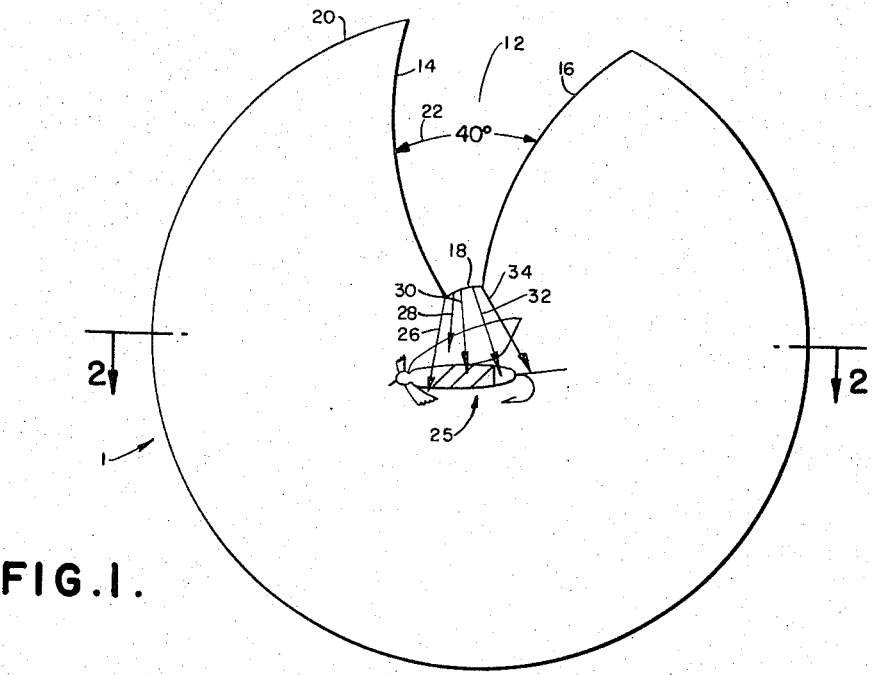
FIGURE 1 is a plan view of the dial illustrating the arcuate window segment provided therein.
Figure 2:
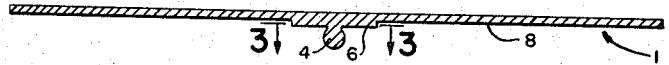
FIGURE 2 is a cross-sectional view of the device taken along line 2—2 of FIGURE 1.
Figure 4:
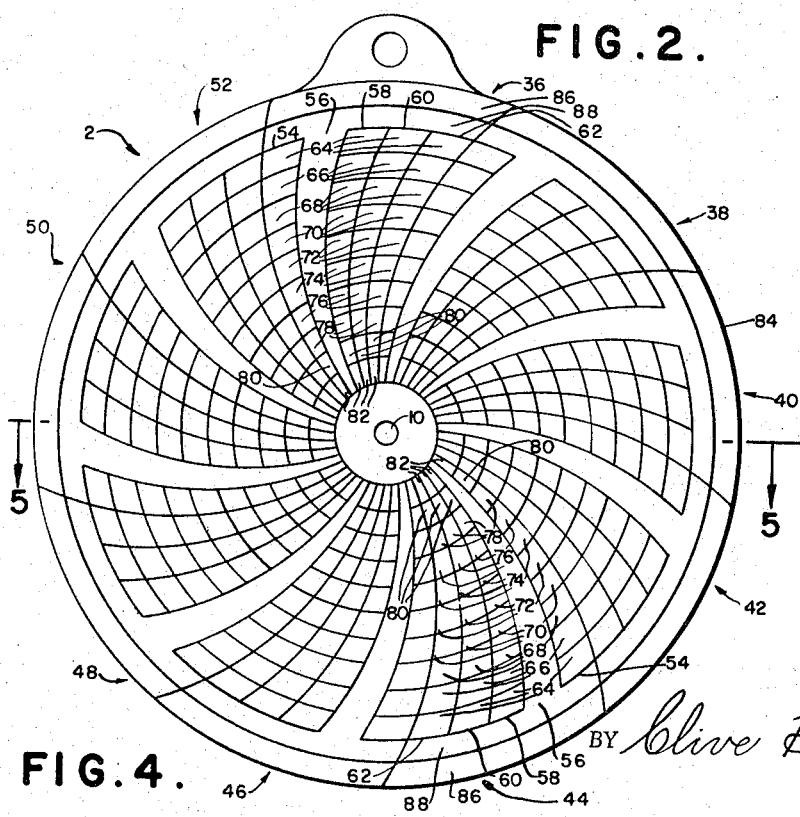
FIGURE 4 is a plan view of the base plate including the indicia arrangement provided thereon.
Figure 3:
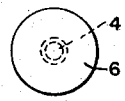
FIGURE 3 is a cross-sectional view taken along line 3—3 of FIGURE 2.
Figure 5:
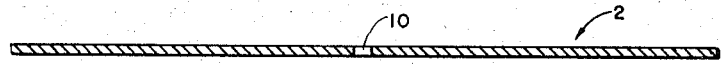
FIGURE 5 is a cross-sectional view taken along line 5—5 of FIGURE 4.
Figure 6:
FIGURE 6 is a side elevational view of the assembled device.
Figure 7:
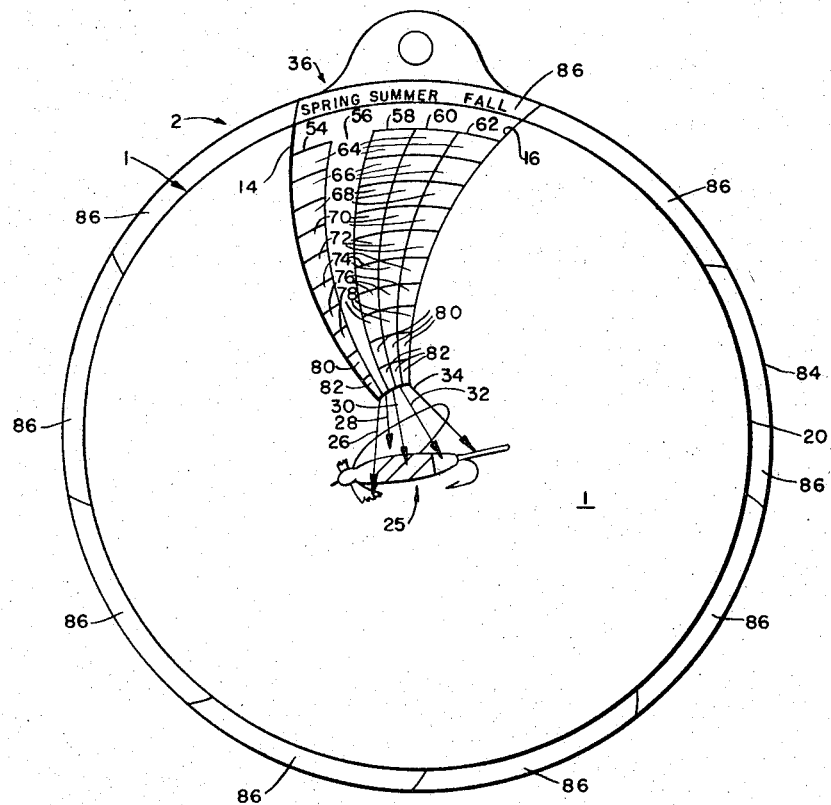
FIGURE 7 is a top plan view of the assembled device.

With reference now to FIGURES 1 and 4 of the drawings, the essential components of the present invention will be seen to comprise, respectively, the dial disc member designated generally by numeral 1 and the base disc member designated generally by numeral 2. As illustrated in FIGURES 6 and 7, dial member 1 is concentrically mounted upon base member 2, it being appreciated that snap ball 4 is adapted to retain said members in superposed relation and further permits rotational movement of said dial member with respect to said base plate member. It will be observed that said snap ball extends normally and integrally of shoulder 6, the latter being integral with respect to reverse surface 8 of said dial disc. Shoulder 6 as shown in FIGURE 6 of the drawings renders the spaced relation between said discs 1 and 2, snap ball 4 being effective in maintaining the pivotal attachment between said discs. Accordingly, said discs will be so secured upon pressing rivet ball 4 through aperture 10 provided centrally of base disc 2, whereupon the superposed arrangement of said discs as illustrated in FIGURES 6 and 7 will be achieved.

It will, however, be appreciated that any suitable method of pivotally connecting one disc member to the other is within the contemplation of this invention.

With more specific reference now to FIGURE 1, the dial disc 1 will be seen to include radially disposed display area 12, said display area being comprised of a segment of said dial disc defined within opposingly spaced arcuate side walls 14 and 16 and inner wall 18, the latter being an arc segment which subtends an angle of 40°, said arc segment being part of a circle which, if drawn, would be concentric with respect to the center of said dial disc. The space between said side walls extending from said arc segment 18 to the periphery 20 of said dial disc is 40° throughout with respect to the angle subtended by the arc segment 22 of any circle drawn concentrically through said display area. It will be understood, however, that said display area may suitably constitute a transparent window in which case walls 14, 16 and 18 will constitute line bondaries of said display area.

A fly lure, generally designated by numeral 25, is displayed upon said dial disc substantially centrally thereof as shown. Lead lines 26, 28, 30, 32 and 34 extend from the hackle, wing, body, tab and tail portions, respectively, of the fly lure and the inner wall 18 of the display area, the function of said lead lines being to correlate the indicia of said base disc with the aforesaid portions of said fly lure in the manner to be described hereinbelow.

As illustrated in FIGURE 4 of the drawings, the base disc, will be observed to be divided into nine equal radial arc segments 36, 38, 40, 42, 44, 46, 48, 50 and 52 each arc segment being substantially congruous of configuration with respect to said display area 12. It will be further observed that each said arc segment is further divided into arcuate columns and concentric rows. With reference to arc segment 36 e.g., which is typically representative of the manner in which arc segments 38, 40, 42, 44, 46, 48, 50 and 52 are divided, it will be observed that said arc segment 36 includes five arcuate columns 54, 56, 58, 60 and 62, columns 54, 58, 60 and 62 being further divided into ten concentric rows 64, 66, 68, 70, 72, 74 76, 78, 80 and 82. Each said arc segment further includes two additional arcuate rows disposed intermediate of periphery 84 of said base disc and the first row 64 of said ten concentric rows. With respect to exemplary arc segment 36, said two additional arcuate rows are designated 86 and 88. As stated, the numerals designating parts of arc segment 36 are similarly utilized herein to designate like parts of the other arc segments. See, for example, arc segment 44.

As shown in FIGURE 7 of the drawings, said base disc 2 is diametrically larger than disc 1 whereby said outermost concentric row 86 is not superposed by said dial disc, said row 86 remaining visible adjacent the periphery 20 of opaque dial disc 1.

The visible row 86 of each respective arc segment 36, 38, 40, 42, 44, 46, 48, 50 and 52 is respectively indicative of the following combinations of seasons: Spring, summer, fall; summer, fall, winter; summer, fall, winter; spring, summer, fall; summer, fall, winter; spring, summer; spring, summer; summer, fall, winter; and summer, fall, winter, such indicia being suitably imprinted upon said respective arc segment rows 86, as shown on arc segment 36, e.g., in FIGURE 7, or stated within an instruction manual which may be furnished to the user of the present device. Thus, in each arc segment provided on the base disc, the outer visible row 86 is used to denote the suggested seasons of the year when the run or hatch of the color identified (lure) fly is most predominant.

The next row 88 of each arc segment combined with column 56 thereof is colored to represent the base-color of the identifying body item of the lure 25, in this instance the wing. The rows 64, 66, 68, 70, 72, 74, 76, 78, 80 and 82 of columns 54 are the colors of the hackles used with the wing, the respective rows in columns 58 are the colors of the bodies, the respective rows in columns 60 are the colors of the stripe or tab, and the respective rows in columns 62 are the colors of the tails. The colors of the various rows of the respective columns of the respective arc segments together with the colors of rows 88 thereof are set forth as follows:

Arc Segment 36: Row 88 and Column 56 are White

| Row | Column 54 | Column 58 | Column 60 | Column 62 |
|---|---|---|---|---|
| 64 | White | White | Grey | White |
| 66 | Grey | Green | Red | Red |
| 68 | Red | Yellow | Silver | Red |
| 70 | Red | Red | Gold | Red |
| 72 | Orange | Orange | Yellow | Black |
| 74 | Yellow | Orange | Black | Yellow |
| 76 | Brown | Green | Gold | Brown |
| 78 | Brown | Black | Gold | Brown |
| 80 | Brown | Red | Gold | Red |
| 82 | Brown | Red | Red | Red |

Arc Segment 38: Row 88 and Column 56 are Grey with Mottled Black Cross-hatching

| Row | Column 54 | Column 58 | Column 60 | Column 62 |
|---|---|---|---|---|
| 64 | Brown | Orange | Black | Brown |
| 66 | Brown | White | Red | Brown |
| 68 | Brown | Red | Yellow | Yellow |
| 70 | Brown | Grey | Grey | Brown |
| 72 | Brown | Orange | Brown | Brown |
| 74 | Brown | Silver | Gold | Gold |
| 76 | Blue | Yellow | Silver | Red |
| 78 | Grey | Grey | Grey | Grey |
| 80 | Yellow | Yellow | Blue | Blue |
| 82 | Black | Black | Black | Black |

Arc Segment 40: Row 88 and Column 56 are Light Brown with Mottled Black Cross-hatching

| Row | Column 54 | Column 58 | Column 60 | Column 62 |
|---|---|---|---|---|
| 64 | Brown | Orange | Yellow | Yellow |
| 66 | Brown | Red | Yellow | Red |
| 68 | Brown | Brown | Yellow | Brown |
| 70 | Brown | Yellow | Yellow | Brown |
| 72 | Brown | Brown | Red | Brown |
| 74 | Brown | Brown | Yellow | Black |
| 76 | Red | Blue | Yellow | Red |
| 78 | Red | Red | Gold | Gold |
| 80 | Red | Grey | Grey | Yellow |
| 82 | Black | Yellow | Yellow | Yellow |

Arc Segment 42: Row 88 and Column 56 are White with Mottled Black Cross-hatching

| Row | Column 54 | Column 58 | Column 60 | Column 62 |
|---|---|---|---|---|
| 64 | Black | Yellow | Gold | Gold |
| 66 | Yellow | White | Gold | White |
| 68 | Grey | Silver | Red | Gold |
| 70 | Brown | Orange | Blue | Blue |
| 72 | Brown | Black | Black | Black |
| 74 | Brown | Black | Brown | Brown |
| 76 | Brown | Brown | Yellow | Yellow |
| 78 | Brown | Green | Brown | Brown |
| 80 | Brown | Red | Brown | Brown |
| 82 | Brown | Grey | Yellow | Yellow |

Arc Segment 44: Row 88 and Column 56 are Grey

| Row | Column 54 | Column 58 | Column 60 | Column 62 |
|---|---|---|---|---|
| 64 | Brown | White | Grey | Brown |
| 66 | Brown | Black | Red | Brown |
| 68 | Brown | Black | Gold | Brown |
| 70 | Brown | Black | Black | Brown |
| 72 | Yellow | Black | Black | Brown |
| 74 | Grey | Black | White | Grey |
| 76 | Grey | Silver | Red | Grey |
| 78 | Grey | Red | Red | Grey |
| 80 | Black | Green | Silver | Grey |
| 82 | Black | Gold | Black | Gold |

Arc Segment 46: Row 88 and Column 56 are Yellow

| Row | Column 54 | Column 58 | Column 60 | Column 62 |
|---|---|---|---|---|
| 64 | Yellow | Yellow | Silver | Yeollw |
| 66 | Yellow | Green | Gold | Red |
| 68 | Yellow | Yellow | Black | Black |
| 70 | Red | Silver | Gold | Black |
| 72 | Orange | Black | Orange | Black |
| 74 | Brown | Red | Red | Red |
| 76 | Brown | Green | Black | Yellow |
| 78 | Brown | Yellow | Gold | Red |
| 80 | Brown | Gold | Black | Black |
| 82 | Black | Black | Gold | Black |

Arc Segment 48: Row 88 and Column 56 are Red

| Row | Column 54 | Column 58 | Column 60 | Column 62 |
|---|---|---|---|---|
| 64 | Red | Red | Yellow | Red |
| 66 | Red | Grey | Grey | Red |
| 68 | Red | White | Red | Red |
| 70 | Red | White | Yellow | Red |
| 72 | White | Blue | Yellow | Blue |
| 74 | Gold | Silver | Yellow | Red |
| 76 | Brown | Yellow | Red | Red |
| 78 | Brown | Black | Red | Red |
| 80 | Black | Red | Yellow | Black |
| 82 | Black | Red | Black | Black |

Arc Segment 50: Row 88 and Column 56 are Brown

| Row | Column 54 | Column 58 | Column 60 | Column 62 |
|---|---|---|---|---|
| 64 | Red | Red | Gold | Yellow |
| 66 | Red | Yellow | Yellow | Yellow |
| 68 | Red | White | Red | Red |
| 70 | Yellow | Black | White | Yellow |
| 72 | White | White | White | Green |
| 74 | Brown | Green | Gold | Brown |
| 76 | Brown | Silver | Silver | Brown |
| 78 | Brown | Brown | Gold | Brown |
| 80 | Black | Brown | Green | Green |
| 82 | Black | Green | Gold | Gold |

Arc Segment 52: Row 88 and Column 56 are Black

| Row | Column 54 | Column 58 | Column 60 | Column 62 |
|---|---|---|---|---|
| 64 | Brown | Silver | Black | Brown |
| 66 | Red | Yellow | Silver | Yellow |
| 68 | Yellow | Yellow | Gold | Yellow |
| 70 | Red | Gold | Red | Red |
| 72 | Black | Red | Gold | Black |
| 74 | Black | Brown | Gold | Red |
| 76 | Black | Black | Gold | Red |
| 78 | Black | Black | Gold | Black |
| 80 | Black | Black | Gold | Black |
| 82 | Black | Black | Black | Black |

Accordingly, the user with the present lure selecting guide, may determine a desired color lure (fly) by wing color, i.e., row 88 and column 56, and may select its hackle, body, stripe and tail color composition within any individual row of a respective arc segment without reference to commercial or popular name, and with respect to the season when a particular fly color is most prominent.

The predominant colors of fly wings are various shades of white, grey, red, yellow, black brown, white with mottled black cross-hatching, grey with black mottled cross-hatching, and brown with black mottled cross-hatching. Fly lures, are therefore, identified by the predominant color of the wing.

In operating the device, the display area 12 is rotated upon base disc 2 until the arc segment 36, 38, 40, 42, 46, 48, 50 or 52 having the desired fly wing color appears within said display area; i.e., until the entire row 88 of the selected arc segment is subtended between the side walls 14 and 16 of said display area. Lead lines 26, 28, 30, 32 and 34 which extend between the columns of the selected arc segment and the hackle, wing, body, tab (stripe) and tail portions of the lure, will then indicate the suitable combinations of color patterns for said portions, said combinations being illustrated by the individual rows, each row presenting a suitable combination. When colors in columns 60 and 62 are identical, a fly without a tail may be used. When using a wet fly, column 62 may be disregarded. For a mixed color wing fly, the arc segment having the most prominent color thereof should be selected. As previously disclosed, row 86 suggests the seasons in which the fly colors shown are most predominant.

Although the preferred embodiment of the mechanical artificial fishing lure guide has been described, it will be understood that within the purview of this invention various changes may be made in the forms, details, proportion and arrangement of parts, the combination thereof and mode of operation, which generally stated consists in a device capable of carrying out the objects set forth, as disclosed and defined in the appended claims.

What is claimed is:

1. An artificial fishing lure guide comprised of a dial disc and a base disc, the former being centrally pivoted to the latter, said dial disc having a radially disposed display area provided therein, said display area being comprised of a segment defined within opposingly spaced side boundary means and an inner boundary means, said dial disc having a fishing lure displayed thereon and a plurality of lead lines extending between portions of said fishing lure and said inner boundary means, said base disc being divided into a plurality of radial arc segments, each arc segment being substantially congruous with respect to said display area, each arc segment being divided into a plurality of arcuate columns, said lead lines being arranged to align with respective arcuate columns of an arc segment, respectively, appearing within said display area upon rotation of said dial disc whereby a respective arc segment is completely visible within the boundary means of said display area.

2. An artificial fishing lure guide as set forth in claim 1 wherein said inner boundary means comprises a concentric arc segment subtending an angle of approximately 40°, and wherein the space between said side boundary means is characterized by a 40° angle.

3. An artificial fishing lure guide as set forth in claim 1 wherein said lure display is disposed centrally of said dial disc.

4. An artificial fishing lure guide as set forth in claim 1 wherein said lead lines comprise five in number.

5. An artificial fishing lure guide as set forth in claim 4 wherein said base disc is divided into nine equal radial arc segments, each arc segment being divided into five arcuate columns, and four of said arcuate columns being divided into ten concentric rows.

6. An artificial fishing lure guide as set forth in claim 5 wherein each arc segment includes first and second concentric rows disposed between the periphery of said base disc and said ten concentric rows.

7. An artificial fishing lure guide as set forth in claim 6 wherein said base disc is diametrically larger than said dial disc whereby said first concentric row is not superposed by said dial disc.

References Cited

UNITED STATES PATENTS

| | | | |
|---|---|---|---|
| 1,327,005 | 1/1920 | Young | 40—70 X |
| 1,636,991 | 7/1927 | Fueglein | 235—88 |
| 2,532,061 | 11/1950 | Glick | 43—4 X |
| 2,809,458 | 10/1957 | Wilbourn | 43—1 |

EUGENE R. CAPOZIO, *Primary Examiner.*

R. CARTER, *Assistant Examiner.*